United States Patent
Tosh et al.

(10) Patent No.: US 6,847,944 B1
(45) Date of Patent: Jan. 25, 2005

(54) METHOD OF EVALUATING LONG-TERM AVERAGE PORTFOLIO RISK AND RETURN FOR CYCLICAL CORPORATION

(75) Inventors: Dennis Alan Tosh, Taylor, MI (US); Mark Paul Everson, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 09/540,368

(22) Filed: Mar. 31, 2000

(51) Int. Cl.[7] .............................................. G06F 17/60
(52) U.S. Cl. ............................. 705/36; 705/35; 705/37
(58) Field of Search ............................... 705/36, 35, 37

(56) References Cited

U.S. PATENT DOCUMENTS

| | | | |
|---|---|---|---|
| 5,778,367 A | 7/1998 | Wesinger, Jr. et al. | |
| 6,003,018 A | 12/1999 | Michaud et al. | |
| 6,078,904 A | * 6/2000 | Rebane | 705/36 |
| 6,282,520 B1 | * 8/2001 | Schirripa | 705/36 |
| 6,292,787 B1 | * 9/2001 | Scott et al. | 705/36 |

FOREIGN PATENT DOCUMENTS

| | | | |
|---|---|---|---|
| WO | WO 99/56192 | * 11/1999 | G06F/17/60 |

OTHER PUBLICATIONS

Black et al.; "Global Portfolio Optimization", Financial Analysts Journal; Sep./Oct. 1992; ABI/INFORM Global, p. 28.*

Nawrocki, David N; Apocalypse Revisited: Do You Know Where Your OPtimizer Is at Night?, Journal of Financial Planning; Dec. 1996; ABI/INFORM Global, p. 68.*

* cited by examiner

*Primary Examiner*—Jagdish Patel
(74) *Attorney, Agent, or Firm*—Damian Porcari

(57) ABSTRACT

A method of evaluating long-term average portfolio risk and return for a cyclical corporation includes the steps of obtaining historical pricing information for financial instruments used for a relevant historical period and dividing the relevant historical period up into time segments. The method also includes calculating a gain or loss for each financial instrument in a portfolio for the time segments over the relevant historical period and obtaining actual cash level for each time segment and dividing up the actual cash level of the corporation between asset classes to determine what the portfolio is invested in. The method further includes the steps of determining an average return and risk for a typical one of the time segments over the historical period and using an optimization framework to pick out the most efficient portfolios in risk versus return.

9 Claims, 1 Drawing Sheet

METHOD OF EVALUATING LONG-TERM AVERAGE PORTFOLIO RISK AND RETURN FOR CYCLICAL CORPORATION

BACKGROUND OF THE INVENTION

1. Field of the Invention

The present invention relates generally to methods of doing business and, more specifically, to a method of evaluating long-term average portfolio risk and return for a cyclical corporation.

2. Description of the Related Art

It is known to evaluate long-term risk versus return for a portfolio of financial instruments such as bonds of a cyclical corporation. One typical approach is to take a series of different unchanging bond portfolios and evaluate their average risk and return over some historical period. From these calculations, each portfolio's position on a risk versus return graph is plotted and an "efficient frontier" line of best portfolios is selected. This approach suffers from the disadvantage in that it is assumed that the investor has the same amount of money or cash holdings on hand to invest each segment. This is certainly true for a wide class of investors, but is clearly not the case for a cyclical corporation which will tend to have wide swings in the amount of corporate cash holdings on hand during given market periods. This is essential for doing the correct analysis for a cyclical corporation, because a higher return when the corporation is likely to have little cash is of little benefit. Simply using a constant level of cash, as is typically done, runs the risk of overstating the average return of such a portfolio for a given level of risk. Furthermore, this distinction is expected to make a difference since the cyclical corporation's cash balance is generally tied to the overall performance of the economy, and the performance of the bond market is also tied to the overall performance of the economy.

As a result, it is desirable to provide a method of evaluating long-term average portfolio risk and return for a cyclical corporation. It is also desirable to provide a method that includes the actually observed or expected cyclical cash levels of a corporation into the usual "constant cash" method for evaluating long-term historical risk versus return prospects for portfolios of financial instruments. It is further desirable to provide a method that can be used for both bond and stock portfolios and other sorts of portfolios consisting of financial instruments. It is still further desirable to obtain an unbiased long-term evaluation of the risk and return of a particular strategy for the bond portfolio for a cyclical corporation.

SUMMARY OF THE INVENTION

Accordingly, the present invention is a method of evaluating long-term average portfolio risk and return for a cyclical corporation including the steps of obtaining historical pricing information for financial instruments used for a relevant historical period and dividing the relevant historical period up into time segments. The method also includes the steps of calculating a gain or loss for each financial instrument in a portfolio for the time segments over the relevant historical period, obtaining an actual cash level of the corporation for each time segment and dividing up the actual cash level between asset classes to determine what the portfolio is invested in. The method further includes the steps of determining an average return and risk for a typical one of the time segments over the historical period and using an optimization framework to pick out the most efficient portfolios in risk versus return.

One advantage of the present invention is that a method is provided of evaluating long-term average portfolio risk and return for a cyclical corporation. Another advantage of the present invention is that the method includes the actually observed or expected cyclical cash levels of a corporation during the historical period into the usual "constant cash" method for evaluating long-term historical risk versus return prospects for portfolios of financial instruments such as bonds and stocks. Yet another advantage of the present invention is that the method provides an unbiased long-term evaluation of the risk and return of a particular strategy for the bond portfolio of a cyclical corporation. Still another advantage of the present invention is that the method can result in expected average returns being approximately 0.4% below those measured using the standard constant-cash method.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
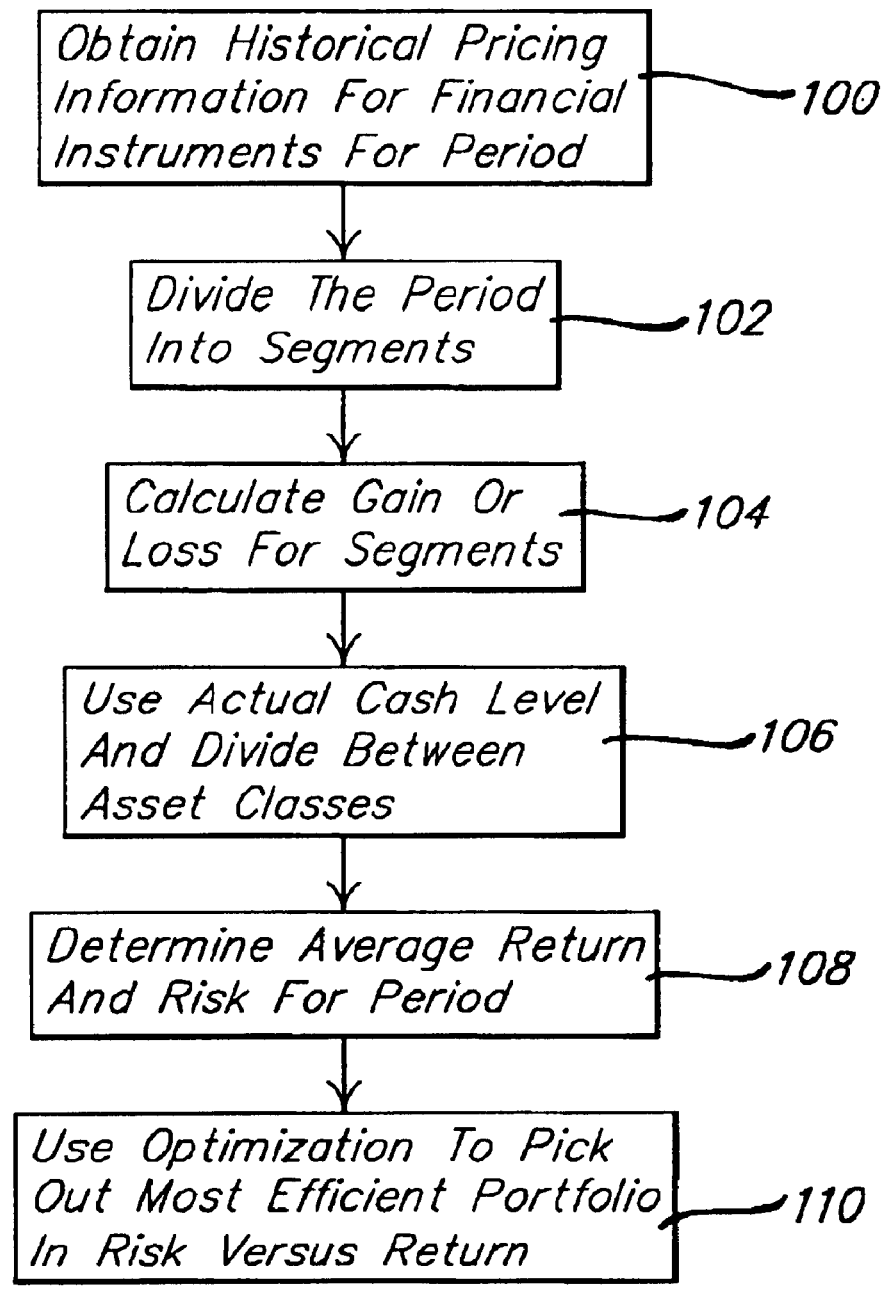
FIG. 1 is a flowchart of a method, according to the present invention, of evaluating long-term average portfolio risk and return for a cyclical corporation.

Referring to the drawings and in particular FIG. 1, one embodiment of a method, according to the present invention, of evaluating long-term average portfolio risk and return for a cyclical corporation is shown. The method is to be carried out on a computer system that includes a computer having a memory, a processor, a display and user input mechanism, such as a mouse or keyboard (not shown).

The method evaluates historical risk and return used in modern portfolio theory as is known in the art. In the present invention, the method starts in block 100 and obtains historical pricing information for the financial instruments used for a relevant historical period. In one embodiment, the financial instruments are bonds, but may be stocks or other types of financial instruments. The relevant historical period may be years, decades, or the like. The information may be stored on a server memory, the memory of a computer, a magnetic disk storage device, or any one of numerous other electronic or magnetic storage devices. In one embodiment, the information is the bond price history over approximately the last decade. The method advances to block 102 and divides the historical period up into time segments, for example quarters or days. The method then advances to block 104.

In block 104, the method calculates the gain or loss, according to market prices, for each type of financial instrument, for example a U.S. Treasury Bond with a one-year maturity, for all time segments over the historical period. The method advances to block 106 and obtains the actual cash level of the corporation for each time segment of the historical period. The actual cash level may be stored on a server memory, the memory of a computer, a magnetic disk storage device, or any one of numerous other electronic or magnetic storage devices. The method includes using the actual cash level when pricing the financial instruments in a portfolio for that segment and dividing up the actual cash level between asset classes of the financial instruments to determine what the portfolio is invested in. It should be appreciated that the modern portfolio theory typically uses a constant cash level, which assumes that the investor such as the corporation has the same amount of money or cash holdings on hand to invest each time segment.

From block 106, the method advances to block 108 and determines the average return for a given portfolio of the financial instruments by the average return of the portfolio of the financial instruments over all time segments or the historical period. The method calculates the average return by simple arithmetic average of returns for the time segments. The method measures the risk by the standard deviation of the total return (coupon payment plus price change for the bond) for each time segment as is known in the art. The method advances to block 110 and uses an optimization framework such as linear programming to pick out the most efficient portfolios in risk versus return as is known in the art. It should be appreciated that the average return and risk is determined for a "typical segment" over the entire time or historical period. It should also be appreciated that standard deviation is only one way of a class of ways to measure risk and the risk may be measured, for example, by "mean absolute deviation" as is known in the art.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A computer implemented method of evaluating long-term average portfolio risk and return for a cyclical corporation, said method comprising the steps of:

obtaining by a computer historical pricing information for financial instruments used for a relevant historical period;

dividing by the computer the relevant historical period up into time segments;

calculating by the computer a gain or loss for each financial instrument in each of a plurality of portfolios based on the pricing information for the time segments over the relevant historical period;

obtaining by the computer actual cash level of the corporation for each time segment and dividing up the actual cash level between asset classes of the financial instruments;

determining by the computer an average return and risk for each portfolio of the financial instruments based on the calculated gain or loss and divided actual cash level for a typical one of the time segments over the historical period; and using by the computer an optimization framework to pick out the most efficient portfolios of the financial instruments in risk versus return based on the determined average return and risk.

2. A computer implemented method as set forth in claim 1 wherein said step of obtaining comprises obtaining by the computer a bond price history over the historical period.

3. A computer implemented method as set forth in claim 1 wherein said step of dividing comprises dividing by the computer the historical period into quarters or days.

4. A computer implemented method as set forth in claim 1 wherein said step of calculating comprises calculating by the computer a gain or loss for each financial instrument over the historical period.

5. A computer implemented method as set forth in claim 1 wherein said step of obtaining comprises obtaining by the computer the actually observed or expected cash levels during the historical period.

6. A computer implemented method as set forth in claim 1 wherein said step of determining comprises calculating by the computer the average return of the portfolio over all time segments.

7. A computer implemented method as set forth in claim 1 wherein said step of determining comprises measuring by the computer the risk by the standard deviation of the total return over all time segments.

8. A computer implemented method as set forth in claim 1 wherein said step of using comprises using by the computer an optimization framework to pick out the most efficient portfolios in risk versus return.

9. A computer implemented method of evaluating long-term average bond portfolio risk and return for a cyclical corporation, said method comprising the steps of:

obtaining by a computer historical pricing information for bonds in each of a plurality of portfolios for a relevant historical period;

dividing by the computer the relevant historical period up into time segments;

calculating by the computer a gain or loss for each bond based on the pricing information for the time segments over the relevant historical period;

obtaining by the computer actual cash level of the corporation for each time segment and dividing up the actual cash level between asset classes of the bonds;

determining by the computer an average return and risk for each portfolio of the bonds based on the calculated gain or loss and divided actual cash level for a typical one of the time segments over the historical period; and using by the computer an optimization framework to pick out the most efficient portfolios of the bonds in risk versus return based on the determined average return and risk.

* * * * *